United States Patent

[11] 3,630,237

[72] Inventors William R. Varnell;
Mance R. Mitchell, both of San Antonio, Tex.
[21] Appl. No. 9,693
[22] Filed Feb. 9, 1970
[45] Patented Dec. 28, 1971
[73] Assignee Concrete Development Corporation
San Antonio, Tex.
Original application Nov. 13, 1967, Ser. No. 685,239, now Patent No. 3,506,752, which is a continuation-in-part of Ser. No. 366,332, May 11, 1964, abandoned, Ser. No. 429,516, Feb. 1, 1965, abandoned, and Ser. No. 659,830, July 6, 1967, abandoned. Divided and this application Feb. 9, 1970, Ser. No. 9,693

[54] POLYESTER CONCRETE PIPE
2 Claims, 13 Drawing Figs.
[52] U.S. Cl........................................ 138/176, 138/177, 138/178
[51] Int. Cl........................................ F16l 9/08
[50] Field of Search............................................ 138/145, 146, 175, 176, 177, 178, 174; 264/134, 311, 170, 228, 270, 135; 29/452; 242/7.21, 7.22

[56] References Cited
UNITED STATES PATENTS

| | | | |
|---|---|---|---|
| 2,236,108 | 3/1941 | Miller et al. ................... | 138/176 |
| 2,569,612 | 10/1951 | Laurent......................... | 138/176 |
| 3,177,902 | 4/1965 | Rubenstein..................... | 138/176 |

Primary Examiner—Houston S. Bell, Jr.
Attorney—Christie, Parker & Hale

ABSTRACT: Concrete pipe is made from a mixture of polyester resin and aggregate, and may be wrapped with resin coated aluminum reinforcing wire in tension to increase the internal pressure which the pipe can withstand. The pipe may also be reinforced with longitudinally placed resin coated aluminum bars. Both the reinforcing wire and bars are coated with resin while at an elevated temperature to avoid any substantial detrimental reaction between the aluminum and polyester resin.

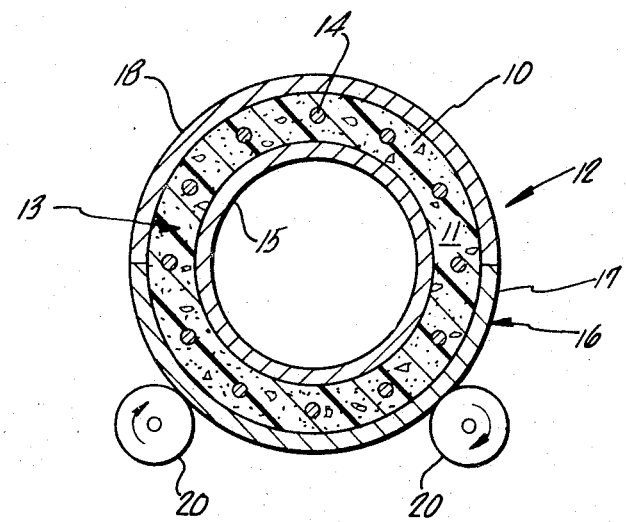
FIG_1
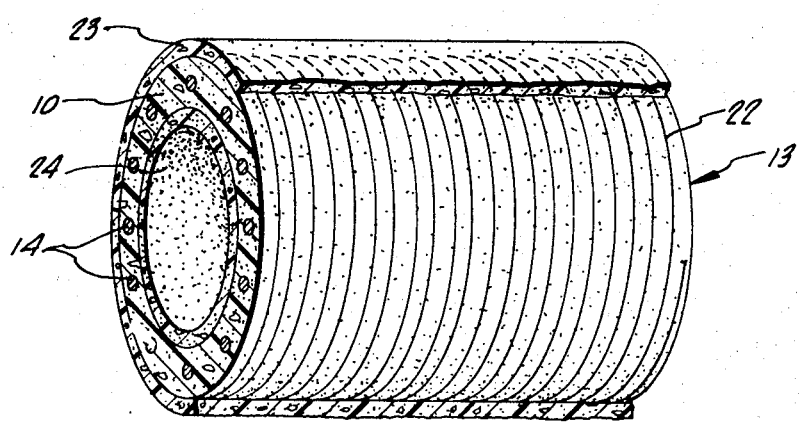
FIG_2
INVENTORS.
WILLIAM R. VARNELL
MANCE R. MITCHELL
BY
Christie, Parker & Hale
ATTORNEYS

INVENTORS.
WILLIAM R. VARNELL
MANCE R. MITCHELL

ATTORNEYS.

INVENTORS.
WILLIAM R. VARNELL
MANCE R. MITCHELL

ATTORNEYS.

POLYESTER CONCRETE PIPE

CROSS-REFERENCES TO RELATED APPLICATIONS

This is a division of application Ser. No. 685,239 filed Nov. 13, 1967, now U.S. Pat. No. 3,506,752, which is a continuation-in-part of copending U.S. applications Ser. No. 366,332, filed May 11, 1964 (now abandoned), Ser. No. 429,516, filed Feb. 1, 1965 (now abandoned), and Ser. No. 659,830, filed July 6, 1967 (now abandoned), and relates to a pipe made with polyester resin concrete.

Conventional Portland cement concrete pipe does not have sufficient strength or resistance to weathering and chemical attack to meet many industrial needs. It has been proposed in the past to coat conventional Portland cement concrete pipe with polyester resins to make the product more durable and resistant to weathering and chemical attack. U.S. Pat. No. 2,962,052 discloses such a use. However, it is difficult and expensive to apply polyester resins to Portland cement concrete surfaces.

Our invention eliminates such disadvantages by providing a pipe cast from a plastic resin cement concrete, thereby avoiding the necessity of a subsequent coating step. This invention employs the discovery that finely divided aggregate solid particles of matter, chemically inert to the various plastics or resins or monomers and mixtures thereof employed in our invention, herein described and variously referred to as "plastics," "plastic mixtures," "resins," "resinous mixtures," or "resin-monomer mixtures," may be utilized, first, to stabilize and extend the shelf life of liquid plastics, resins, monomers and mixtures thereof prior to curing, and second, to change or modify the structural behavior and characteristics of plastic or resinous materials in such manner as to impart added stability, strength, rigidity and adhesive qualities, among other things, to such plastic materials after curing.

More specifically, this invention uses such aggregates and such plastic materials and modifications thereof to formulate plastic resin cements of unique characteristics for use in casting structural concrete pipe.

As used herein, the term "aggregate" includes a natural stone or sand such as a chert, traprock, granite, quartz, limestone, basalt, silica sand, etc., or a manufactured or treated product such as burned clay, tabular alumina or blast furnace slag, used in conjunction with a cementing agent to form a solid body of concrete or a "concretion" of desired form. As employed in concrete mixtures, the aggregates are customarily graded from any desired maximum size, usually not more than about 1 -inch sieve size or more than one-half the thickness of the concrete product being formed, downward continuously to the smallest size particle employed, in such manner as to result in a practical minimum of voids. The final voids of such mixture are filled with a cementing agent which, after curing, produces an essentially solid mass. The required gradation of aggregates is obtained by screening or crushing and screening of the original materials. The minimum size of concrete aggregates commercially available is usually that which is retained on a 100-mesh screen.

The term "plastic resin concrete" is used herein to describe a mass composed of graded aggregates cemented together with a plastic resin cement.

Polyester resins are the preferred plastics for use in this invention. The term "polyester resin" is used to mean a mixture of an ethylenically unsaturated alkyd resin and polymerizable vinyl monomer such as styrene. The preferred resins of this class for employment in the concrete compositions of the invention are the polymeric ester reaction products of one or more dicarboxylic acids and one or more polyhydric alcohols. One or more of these reactants contains a reactive double bond or ethylenic linkage. Among the dicarboxylic acids which may be used are phthalic, malic, maleic, fumaric, adipic, pimelic, suberic, sebacic, itaconic, citraconic, and succinic acids and their anhydrides. It is preferred that some of the dicarboxylic acid component of the polyester resin contain an unsaturated ethylenic linkage. For this reason, maleic and fumaric acids are most desirable. Among the polyhydric alcohols which may be used are ethylene glycol, diethylene glycol and propylene glycol. A mixture of propylene glycol and dipropylene glycol is a satisfactory polyhydric alcohol. An unsaturated monohydric alcohol may be used in place of part of the polyhydric alcohol. A typical example of such an alcohol is allyl alcohol which produces an allyl ester of the dicarboxylic acid. The polyester resins may be suitably modified or plasticized by the incorporation of alcohols, fatty acids, etc., to modify the chemical and physical characteristics as desired. The polyesters should comprise upward from about 40 percent and preferably 40 to 60 percent by weight of the resin and resin forming component, e.g., styrene, of the composition.

The resin should also contain a nonvolatile, monomeric, cross-linking solvent for the polyester. The function of this solvent is to make the polyester resin more fluid and also to cross-link the polyester at the time of curing to produce a cross-linked, or three-dimensional resin with the polyester which is thermosetting in character. This monomeric solvent is an important member of the resin component, for it provides the necessary fluidity to the resin component, imparts thermosetting characteristics to the cured resin and is consumed during the curing of the resin without forming volatile materials. This freedom from volatility is important for otherwise the release of volatile matter would produce bubbles, voids, or pinholes on the surface and throughout the pipe. The lack of volatile matter also permits curing when under pressure without requiring provision for vents, etc., in the molds.

Among the monomeric polymerizable solvents which may be used are styrene, vinyl toluene, e.g., o-vinyl toluene, p-vinyl toluene, and m-vinyl toluene; cyclopentadiene; vinyl acetate; diallyl esters, e.g., diallyl phthalate and triallyl cyanurate, as well as alphamethyl styrene. Styrene has produced the most satisfactory results thus far.

When produced commercially, these resin compositions contain a small amount of a polymerization inhibitor so as to prevent gelation during storage prior to usage. Such inhibitors include the well-known antioxidants: hydroquinone, t-butyl catechol, quinone, etc.

Some of the polyester resins of the character contemplated for use in the present invention are sold in the trade and identified as "Oronite," "Polylite," "Selectron," "Paraplex," or "Vibrin" resins. In general, these resins are unsaturated high molecular weight polymers made by reacting one or more acids or a blend of acids, such as maleic or fumaric acid, with a dihydroxy alcohol, such as ethylene glycol. The specific properties of these resins vary depending largely upon the type and amount of each constituent in the combination.

Examples of other high-polymer or copolymer plastics and resins or monomers used in our invention include both the thermosetting and thermoplastic materials.

Among the thermosetting resins are the epoxy, amino, alkyd, phenolic, polyester, urethane, allylic and silicone resins. Examples of the thermoplastics include nylon, polycarbonate, acrylic, acetal, vinyl, cellulosic, styrene, polystyrene, chlorinated polyether, fluorocarbon, polypropylene and polyethylene resins.

As the catalysts, there can be utilized numerous oxidizing catalysts, such as cumene hydroperoxide, dicumyl peroxide, benzolyl peroxide, and methyl-ethyl-ketone peroxide. The catalyst is usually employed in an amount of 0.5–4 percent of the polyester resin. Preferably, there is utilized with the catalyst a metallic drier such as manganese or cobalt naphthenate, for example. A typical example of a satisfactory catalyst-drier combination is 2 percent benzolyl peroxide, 0.75 percent manganese naphthenate and 0.75 percent cobalt naphthenate based on the polyester resin.

Briefly, our invention provides a plastic resin concrete pipe comprising a tubular body cast from a mixture of polyester resin and aggregates. The aggregates are present in the amount of about 40 percent up to about 95 percent of the product by weight. The aggregate is preferably graded in particle size to range from less than 0.001 micron up to the maximum size to leave a minimum of unfilled gaps or voids between adjacent particles of the aggregates. The fine particles are present in the amount between about 1 and about 60 percent by weight of the combined weight of the polyester resin and fine particles. The maximum size or diameter of particles in any given usage would be generally limited to about one-half the thickness of the pipe, and may be as much as several inches as determined by proper engineering procedures.

A reinforcing wire is secured in tension around the body to increase the tensile strength of the pipe and make it suitable for holding fluids under high pressure. The wire is preferably coated with polyester resin cement or concrete to protect it from abrasion and corrosion. Preferably, the wire has a coefficient of expansion substantially equal to that of the polyester concrete. Aluminum alloy wire with a coefficient of about 0.000012 per degree F. is well suited to meet this requirement. For added strength, the pipe body is also reinforced with longitudinal reinforcing rods imbedded in it.

For the purposes of our invention we supplement the commercially available aggregates with materials passing the 100-mesh size and graded downward therefrom to produce a substantial percentage by weight of less than 20-micron size and extending preferably to less than 1 micron in size. Hereinafter those inorganic particles of aggregate larger than about 20 microns are referred to as "aggregates" and those finer than about 20-micron size are referred to as "finely divided particles" or "fine particles." The finely divided particles are selected from materials of high strength (as distinguished from "fillers" and essentially inert chemically to the plastic materials with which they are employed. Examples are traprock dust, chert dust, silica flour ($SiO_2$), titanium flour ($TiO_2$), aluminum trioxide ($Al_2O_3$), tabula alumina, aluminum silicate, llanite (granite) dust, aluminum trifluoride, haydite, and porphyrite docite. All these materials have a hardness on the Mohs scale of greater than about 5 and have compressive strengths greater than about 10,000 p.s.i.

Ideally, the aggregates are graded so that spaces between the largest aggregate particles are progressively filled by smaller particles so as to leave virtually no voids between the particles. The plastic resin is present in sufficient amount to coat the surface of each aggregate particle and bond it to adjacent particles, and to fill those final voids in the mass which can be filled only by a liquid.

That part of the aggregate which is less than 300 mesh is preferably silica flour or titanium dioxide, or a mixture of both. We prefer 20 parts silica to 1 part titanium dioxide, by weight. Preferably, about 90 percent of the silica flour and the titanium dioxide passes through 400-mesh screen and the silica flour is virtually free of metallic content, say, less than 0.5 percent by weight, to avoid any acceleration of setting of the resin when the silica flour and resin are mixed. Other suitable, finely ground, aggregates are given above.

The larger aggregate in the plastic resin concrete of this invention can be any suitable material such as natural stone, traprock (igneous rock), sand, or manufactured inorganic or organic particles.

An important advantage of the concrete pipe of this invention is that the concrete can be bonded to itself without special preparation of the surfaces, thereby permitting the bonding of one segment or layer of the pipe to another.

We have found that the use of finely divided aggregate, i.e., that aggregate which passes through 400-mesh screen (especially that in range of 0.010 to 1.0 micron), made of traprock dust, silica or titanium dioxide and used in conjunction with the larger graded aggregate as described above, greatly increases the strength of the final product so that it need not be as thick to provide much greater strength than is available with conventional Portland cement concrete products. The finely divided aggregate also extends the shelf life of the polyester resin and apparently produces an additional bonding action between the resin and larger aggregate, which increases the final strength of the product. The presence of the finely divided aggregate also increases the tolerance of the polyester resin to traces of moisture which are nearly always present in the larger aggregate, and which otherwise would interfere with or prevent proper setting of the polyester resin. In general, any finely divided aggregate which does not react detrimentally with the resin can be used.

These and other aspects of the invention will be more fully understood from the following detailed description and the accompanying drawings, in which:

FIG. 1 is a vertical section of a pipe being cast in a mold in accordance with this invention;

FIG. 2 is a fragmentary perspective view of an integrally formed pipe cast and reinforced in accordance with this invention;

Figure 3:
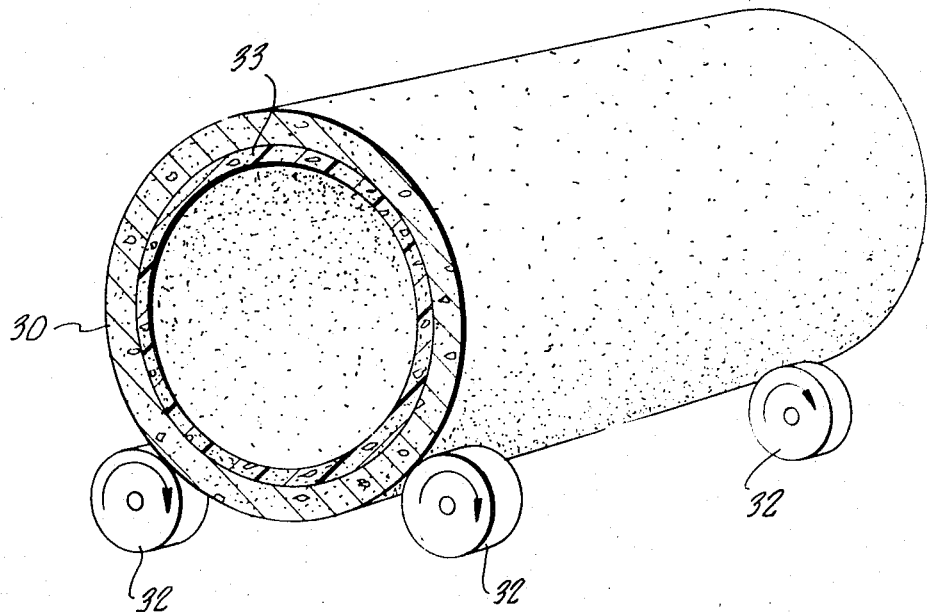
FIG. 3 is a vertical section of a conventional Portland cement concrete pipe being coated on its interior with polyester resin cement or concrete.

Typical examples of polyester resin-aggregate compositions and their uses in casting concrete pipe are given below:

EXAMPLE 1

| | % By Weight |
|---|---|
| A polyester resin slurry was prepared by stirring in a mixing vessel a mixture having the following composition: | |
| About 60 percent by weight of Oronite CR 21728 polyester resin (made by reacting 3 mols of isophthalic anhydride with 6 mols of diethylene glycol and 1.5 mols of ethylene glycol until the acid number is less than 5. Four mols of maleic anhydride is then added with 150 p.p.m. hydroquinone and reacted until the acid number is below 20), and about 40 percent by weight of styrene monomer. (the amount of styrene can be increased to about 60 percent by weight without adverse effect on the final product) | 70.85 |
| (The Oronite CR 21728 is a so-called semiflexible high impact resistance resin. Similar properties are obtained by blending an orthophthalic rigid resin with an orthophthalic flexible resin in a ratio of about 3.0 to 3.9 by weight provided "fine particles" less than about 0.5 micron are present in the amount of at least about 5 percent by weight of the resin, not including styrene.) | |
| Cobalt naphthenate | 0.38 |
| Silica flour (preferably the silica flour has the chemical and has been ground and supplemented with colloidal silica to provide the screen analysis given in table I below) | 7.3 |
| Titanium dioxide | 9.53 |
| Styrene | 11.94 |

The above materials are thoroughly mixed with high speed, high shear equipment to provide thorough dispersion of the fine particles, and the mixture is referred to as polyester resin cement mix No. 1. It has a density of 10.5 pounds per gallon.

The above mixture has an almost indefinite shelf life because of the presence of the finely divided and pure silica flour. It can be used as a primer or seal coat in patching conventional Portland cement and plastic resin concrete structures, or it can be mixed with aggregate and cast as concrete.

Polyester resin mix No. 1 may be used as the cementing agent of a concrete designed to meet certain strength specifications. For example, a polyester concrete is made by mixing the following ingredients:

EXAMPLE 2

| | Pounds |
|---|---|
| Polyester resin cement mix No. 1 | 9.10 |

| | |
|---|---|
| Methyl-ethyl-ketone peroxide (this is preferably blended with the polyester resin formula No. 1 prior to mixing with the larger aggregate) | 0.13 |
| Additional silica flour of the same character given in example 1 | 15.17 |
| Fine (No. 4 to No. 100) silica aggregate* | 34.10 |
| Medium (1½ inches to No. 4) silica aggregate* | 41.50 |

(*Graded in accordance with New York Port Authority gradation of aggregate schedule. See table II below.)

The aggregate and polyester resin cement mix No. 1 are mixed in a standard concrete mixer for 2 or 3 minutes to disperse the various particle sizes uniformly throughout the entire mixture and to insure uniform coating of all aggregate particles with polyester resin.

The above concrete mixture was then cast and cured to make a polyester concrete having a compressive strength of 10,000 p.s.i., and a tensile strength of 2,500 p.s.i. The above concrete may be cured at ambient temperature. If delay between mixing and placing polyester resin concrete is expected, the initial set may be delayed from 15 to 30 minutes to from 6 to 8 hours by introducing a conventional retarder, such as hydroquinone, in the polyester resin formula No. 1 when the catalyst is added.

The composition of the preferred silica flour is shown in table I below:

TABLE I—Silica Flour

| Chemical Composition | | Particle Size | |
|---|---|---|---|
| Component | % by Weight | Less Than | % by Weight |
| $SiO_2$ | 99.600 | 100 Microns | 100 |
| $Al_2O_3$ | 0.073 | 80 Microns | 90 |
| $Fe_2O_3$ | 0.039 | 60 Microns | 83 |
| $TiO_2$ | 0.28 | 40 Microns | 72 |
| $CaO_2$ | 0.060 | 20 Microns | 47 |
| MgO | 0.010 | 10 Microns | 23 |
| Misc. | 0.050 | 5 Microns | 9 |
| Moisture at 105° C. | 0.080 | 1 Micron | 0 |

NOTE: The 53 percent of particles over 20-micron size is utilized as "aggregates." The 47 percent of particles under 20-micron size is used as "fine particles" which increases the strength of the final product.

Other examples of fine particle materials which have been used are:

TABLE II—Titanium Flour

| Chemical Composition | | Particle Size | |
|---|---|---|---|
| Component | % by Weight | Less Than | % by Weight |
| $TiO_2$ | 99.20 | 1 Micron | 100.0 |
| $P_2O_5$ | 0.30 | 0.75 Micron | 97.0 |
| $K_2O$ | 0.22 | 0.50 Micron | 88.5 |
| $SiO_2$ | 0.08 | 0.40 Micron | 78.5 |
| $Al_2O_3$ | 0.01 | 0.30 Micron | 61.0 |
| $Sb_2O_3$ | 0.01 | 0.20 Micron | 17.0* |
| Misc. | 0.18 | | |

*Includes particles down to 0.004 micron.

TABLE III—Traprock Dust

| Chemical Composition | | Particle Size | |
|---|---|---|---|
| Component | % by Weight | Less Than | % by Weight |
| $SiO_2$ | 39.92–40.32 | 100 Microns | 70.0 |
| MgO | 18.12–20.17 | 80 Microns | 59.0 |
| CaO | 10.55–10.68 | 60 Microns | 46.0 |
| $Al_2O_3$ | 8.60–9.46 | 40 Microns | 31.0 |
| FeO | 7.48–8.00 | 20 Microns | 15.5 |
| $Fe_2O_3$ | 4.40–4.75 | 10 Microns | 12.6 |
| $TiO_2$ | 2.66–2.70 | 5 Microns | 0.6 |
| $Na_2O$ | 1.91–2.62 | 1 Micron | 0.0 |
| $K_2O$ | 1.03–1.10 | | |
| $P_2O_5$ | 0.51–0.68 | | |
| MnO | 0.24–0.25 | | |
| Misc. | 0.25–0.41 | | |

NOTE: The 84.5 percent of particles over 20-micron size is employed as supplementary aggregates in concrete mixtures. The 15.5 percent of particles of under 20-micron size is employed as "fine particles," which increases the strength of the final product.

TABLE IV—Aluminum Silicate (ASP)

| Chemical Composition | | Particle Size | |
|---|---|---|---|
| Component | % by Weight | Less Than | % by Weight |
| $SiO_2$ | 45.4 | 20 Microns | 98 |
| $Al_2O_3$ | 38.8 | 10 Microns | 83 |
| $TiO_2$ | 1.5 | 1 Micron | 10 |
| $Fe_2O_3$ | 0.3 | | |
| CaO | 0.1 | | |
| $Na_2O$ | 0.1 | | |
| Ignition loss | 13.8 | | |

TABLE V—Tabular Alumina

| Chemical Composition | | Particle Size | |
|---|---|---|---|
| Component | % by Weight | Less Than | % by Weight |
| $Al_2O_3$ | 99.50 | 44 Microns | 100 |
| $SiO_2$ | 0.06 | 20 Microns | * |
| $Fe_2O_3$ | 0.03 | | |
| $Na_2O$ | 0.02 | | |
| Misc. | 0.39 | | |

*Inaccurately determined. Estimated at 35 percent.

Other materials used as fine particle constituents include alumina ($Al_2O_3$), aluminum fluoride ($AlF_3$) and colloidal silica consisting 100 percent of particle sizes under 1 micron (from about 0.5 to 0.1 micron).

The use of aggregate materials and fine particles is not limited to the examples stated herein. The essential requirements in each case are that the constituent material possess within itself definite structural characteristics compatible with the end product sought, and that it be free from any detrimental chemical reactivity with the plastic material with which it is employed.

The aggregate used in addition to the silica flour can be any material which does not adversely affect the curing of the polyester resin. Excellent results are obtained by suing silica aggregate graded in accordance with the New York Port Authority Schedule shown in the following table:

TABLE VI

| | Percent Passing By Weight | | |
|---|---|---|---|
| Sieve Size (Square Openings) | Fine Aggregate | ¾ Coarse Aggregate | 1½" Coarse Aggregate |
| 2" | — | — | 100 |
| 1½" | — | 100 | 95–100 |
| 1" | — | 95–100 | 55–75 |
| ¾" | — | 60–80 | 35–55 |
| ⅜" | — | 15–40 | 5–20 |
| No. 4 | 90–100 | 0–5 | 0–5 |

| No. 8 | 80-95 | (Used for thin sections) | (Used for heavy sections) |
|---|---|---|---|
| No. 30 | 25-55 | | |
| No. 50 | 13-25 | | |
| No. 100 | 0-5 | | |

The polyester resin concrete of example 2 is satisfactory for use at temperatures up to about 80° C. (176° F.).

To make a polyester concrete for use at temperatures up to 130° C. (266° F.) Oronite CR 20114 polyester resin is substituted for Oronite CR 21728 in examples 1 and 2. Other chemical and physical properties described above are not materially changed. Oronite CR 20114 is an isophthalic unsaturated polyester made by reacting 1 mol of isophthalic anhydride with 3.41 mols of propylene glycol at 400° F. until the acid number is below 5. Two mols of maleic anhydride are added to the mixture, which is then cooked at 390° F. until the acid number is below 25. The temperature is then raised to 415° F. until the acid number is below 15. One hundred and fifty pounds per minute of hydroquinone is added with the maleic anhydride.

Other concretes are prepared by replacing the Oronite CR 21728 polyester resin with:

| | | % by Weight |
|---|---|---|
| | Polylite 8037 | 60.00 |
| | Polylite 8150 | 40.00 |
| or, | | |
| | Selectron 5835 | 60.00 |
| | Polylite 8150 | 40.00 |

Oronite CR 21728 is replaced when the polyester concrete need not meet the high chemical properties inherent in this resin, nor is there need for as high physical properties.

Referring to FIG. 1, a mixture of plastic resin concrete (made in accordance with any of the foregoing or following examples) 10 is poured into an annular space 11 of a horizontal pipe mold 12 to form a tubular concrete pipe body 13. Longitudinally extending reinforcing bars 14 are disposed within the mixture of concrete, and supported by conventional means (not shown).

The mold includes an inner cylindrical sleeve 15 and an outer sleeve 16 made of a lower semicircular section 17 and an upper semicircular section 18 held together by suitable conventional clamps (not shown). The mold rests on driving rollers 20 which are turned by conventional means to rotate the mold about its longitudinal axis and subject the concrete mixture in it to a centrifugal force between about two and six times that of gravity. The spinning of the mold produces a concrete body of maximum density and strength. The inner sleeve and outer sleeve of the mold are secured together and sealed at their ends by conventional means (not shown) during the molding and spinning process.

After the polyester concrete mixture has set, the mold is opened, the pipe removed from it, and the inner sleeve 15 removed from within the concrete pipe body.

Referring to FIG. 2, reinforcing wire 22 is wrapped in tension around the exterior of the pipe body to increase its tensile strength. The wire is secured to the body or to itself by any suitable conventional clamping means. Thereafter, the wire and exterior surface of the pipe are covered with a layer 23 of resin or concrete to protect the wire from abrasion, corrosion, and the like. The interior surface of the pipe is covered with a layer 24 of cement which further decreases the permeability of the pipe to fluid and insures greater pipe life. After the interior and exterior coatings have set, the pipe is ready for use.

Preferably, the reinforcing wire wrapped around the pipe has about the same coefficient of expansion as the concrete. Aluminum alloy-type 7075T6 is ideally suited for this use because it has a thermal coefficient of expansion approximately the same as that of polyester concrete, namely, about 0.000012 per degree F. The longitudinal reinforcing bars are also preferably of a material which has a thermal coefficient of expansion close to that of the polyester concrete. Conventional reinforcing materials can be used for either the wire or the rods, but an aluminum alloy is preferred. Some aluminum alloys contain materials which react with the polyester resin and interfere with its proper setting. This problem is overcome by coating the wire or rods while hot, say, about 150° F., with polyester resin or polyester cement. The high temperature of the metal causes the resin to set almost instantly and before any undesired reaction can take place. The wires and rods are then satisfactory for use as described above.

Alternatively, the reinforcing rods are coated as just described, and the reinforcing wire is coated after it is placed on the polyester concrete pipe exterior in the position shown in FIG. 2. For example, the wire is heated between about 135° F. and about 260° F., wrapped around the pipe at that temperature. The wire is kept at that temperature by suitable application of heat with conventional means (not shown) and rigidly secured to the pipe or itself. While the wire is still hot, a layer of polyester resin, polyester resin cement, or polyester resin concrete is applied to the hot wire so that the polyester resin is rapidly heated by the wire and caused to set before there is any substantial reaction between the resin and the wire which would interfere with the proper setting of the polyester resin. The pipe, wire, and applied coating are then allowed to cool so that the wire tends to contract and hold the exterior of the polyester pipe in tension.

The resin concrete pipe made as described above has a maximum aggregate size of about one-half the wall thickness of the pipe.

The concrete pipe shown in FIGS. 1 and 2, manufactured as described above, is about 50 percent lighter per lineal foot than conventional Portland cement concrete pipe manufactured to ASTM specifications. The concrete used in the manufacture of the pipe has from two to five times the compressive strength and many times the flexural and tensile strength of materials used in the manufacture of conventional concrete pipe. For example, an unreinforced polyester resin concrete pipe 36 inches in diameter with a wall thickness of 2 inches has from two to three times the breaking strength of conventional Portland cement concrete pipe 36 inches in diameter with a wall thickness of 3¾ inches when tested in accordance with standard ASTM procedures. The breaking strength of polyester concrete pipe reinforced in accordance with this invention is even greater.

Since the compressive flexural and tensile strength, as well as other physical and chemical characteristics, can be controlled in polyester resin concrete, the pipe, as well as other products, made with such material is readily engineered to fit a far wider variety of uses than pipe made with any other building construction material or combination of materials now available and generally used.

Referring to FIG. 3, a conventional Portland cement concrete pipe 30 rests on supporting rollers 32 which are rotated by any suitable conventional means (not shown) to rotate the pipe 30 about its longitudinal axis. A coating 33 of either polyester cement or polyester concrete, such as that defined in examples 1 and 2, is applied to the interior surface of the pipe 30 after the interior surface of the pipe has been treated to remove the film of Portland cement from the aggregate on the interior surface of the body. The inner surface of the Portland cement concrete pipe is suitably prepared by acid etching, sandblasting, abrading, or the like, to remove the Portland cement film and expose the aggregate. Thereafter, the polyester cement or concrete coating is applied to the interior surface of the pipe 30.

In the preferred form, the polyester cement or concrete is applied to the pipe while it is rotating so that centrifugal force drives the unset polyester cement or concrete into the pipe voids, compacting the polyester cement or concrete, and countering any tendency of "pinholing" which would be caused by expansion of air in the pipe voids due to heating resulting from the curing reaction of the polyester resin.

Alternatively, the polyester cement or concrete coating is applied to the interior of the pipe 30 while the pipe is stationary. Thereafter, the pipe is rotated about its longitudinal axis before the polyester resin in the cement or concrete has set, thus driving the polyester resin and fine aggregate particles into the exposed voids of the interior of the pipe 30. The centrifugal force also prevents pinholing which would otherwise be caused by expansion of air in the pipe voids due to heating resulting from the curing of the polyester resin.

The finished product shown in FIG. 3 is a polyester cement or concrete pipe supported on its exterior by conventional Portland cement concrete pipe. The polyester resin cement or concrete layer is strong, compact, and impermeable to fluids because it was set up under centrifugal force. Moreover, the polyester resin cement or concrete makes a secure bond with the conventional Portland cement pipe because of having been driven into the conventional pipe by centrifugal force.

The typical pipe made of the polyester resin concrete of this invention has an exceptionally high compressive strength. The effect of the presence of the silica flour is demonstrated by the following table VII:

TABLE VII

| Percent aggregate | | | | Polyester resin mix without silica flour | Compressive strength (p.s.i.) |
|---|---|---|---|---|---|
| Coarse | Medium | Fine | Silica flour | | |
| 35.0 | 27.5 | 27.5 | 0.0 | 10.0 | 8,000 |
| 45.0 | 17.0 | 26.0 | 2.0 | 10.0 | 8,400 |
| 37.0 | 15.0 | 22.0 | 15.0 | 10.0 | 10,000 |
| 35.0 | 15.0 | 23.0 | 17.0 | 10.0 | 10,900 |

The above table shows that by increasing the silica flour from 0 to 2 percent, the compressive strength was increased 400 pounds from 8,000 to 8,400 p.s.i. The presence of 17 percent silica flour increased the compressive strength to 10,900 p.s.i.

In the above table where silica flour is indicated to be present in the amount of 0.0 percent, the polyester resin concrete in example 1 was modified to contain no silica flour or titanium dioxide. In each of the examples in table VII, the silica flour content is reported as a percentage by weight of the total weight of the specimens tested.

The aggregate reported in table VII is graded as follows:

| Coarse | ¾" to 1" |
| Medium | No. 8 to ¾" |
| Fine | No. 100 to No. 8 |

The distribution of the aggregates in the above groups is in accordance with the New York Port Authority Schedule for grading concrete aggregate.

Another typical example of a polyester resin cement composition used in making concrete pipe is given below:

EXAMPLE 3

| | % By Weight |
|---|---|
| A polyester resin cement slurry is prepared by mixing the following composition: Combine 1 mol of phthalic anhydride with 2 mols of maleic anhydride in the presence of an excess of ethylene or propylene glycol, and reduce the end result with styrene monomer in the amount of about 50 percent by weight in a one-step polymerization process. This resin has an impact strength of about 1.8 foot pounds per inch when the measurement is made on unnotched izod | 69.20 |
| Tricresyl phosphate | 0.06 |
| Wax (melting point 120°–135° F.) | 1.89 |
| Cobalt naphthenate | 0.38 |
| Silica flour (Preferably the silica flour has the chemical and screen analysis given in table I above) | 7.30 |
| Titanium dioxide | 9.53 |
| Styrene | 11.64 |

The above materials are thoroughly mixed, and the mixture is referred to as polyester resin cement mix No. 3. It has a density of about 10.5 pounds per gallon.

The above mixture has an almost indefinite shelf life because of the presence of the finely divided and pure silica flour. It can be used as a substitute for the polyester resin cement of example 1.

Alternatively, 2 mols of phthalic anhydride combined with 1 mol of maleic anhydride in a two-step polymerization process and reacted in the presence of an excess of ethylene or propylene glycol, the resultant resin being reduced with styrene monomer in an amount of about 40 percent by weight, results in a resin having an impact strength of about 1.0 foot pound per inch. This resin can be substituted for the one just described to make polyester resin cement of lower impact strength. Calcium sulfate is substituted for the silica flour and titanium dioxide in the above formulation to reduce further the impact strength of the polyester cement.

By proportioning the basic ingredients of the polyester resin with various amounts of styrene monomer, and by adding calcium sulfate in varying amounts, polyester resin cements may be obtained which vary over a wide range of impact strengths, say, from about 0.10 foot pound per inch to about 2.5 foot pounds per inch. However, when the polyester resin cement is blended with graded aggregate to make a polyester resin concrete, the set concrete has a relatively high strength for withstanding relatively gradually changing compressive loads, such as imposed by wind-loading, and yet has a low impact strength.

A polyester concrete is made by mixing the following ingredients:

EXAMPLE 4

| | Pounds |
|---|---|
| Polyester resin cement mix of example 3 | 9.10 |
| Methyl-ethyl-ketone peroxide (This is preferably blended with the polyester resin cement mix No. 1 prior to mixing with the larger aggregate.) | 0.13 |
| Additional silica flour | 15.17 |
| Fine (No. 4 to No. 100) silica aggregate* | 34.10 |
| Medium (1½" to No. 4) silica aggregate* (*Graded in accordance with New York Port Authority gradation of aggregate schedule. See table IX below.) | 41.50 |

The aggregate and polyester resin cement mix No. 3 are mixed in a standard concrete mixer for 2 or 3 minutes to disperse the various particle sizes uniformly throughout the entire mixture and to insure uniform coating of all aggregate particles with polyester resin.

The above polyester resin concrete mixture is then cast and cured to make polyester concrete pipe as described in detail above. The concrete cures at ambient temperature. If delay between mixing and placing polyester resin concrete is expected, the initial set may be delayed from 15 to 30 minutes to from 6 to 8 hours by adding conventional retarder, such as hydroquinone, in the polyester resin cement mix No. 1 when the catalyst is added.

The composition of the preferred silica flour used in polyester resin mix No. 1 is shown in table VIII below:

TABLE VIII

| Chemical analysis | By Weight |
|---|---|
| Moisture at 105° C. | 0.08% |
| Additional Ignition Loss | 0.06% |
| Silica (SiO₂) | 99.60% |
| Aluminum Oxide (Al₂O₃) | 0.073% |

| | | |
|---|---|---|
| Ferric Oxide (Fe$_2$O$_3$) | | 0.039% |
| Titanium Oxide (TiO$_2$) | | 0.028% |
| Calcium Oxide (CaO) | | 0.06% |
| Magnesium Oxide (MgO) | | 0.01% |
| Undetermined | | 0.05% |

Wet Screen Analysis

| | | % By Weight |
|---|---|---|
| | +100 Mesh | None |
| −100 Mesh | +140 Mesh | 0.03 |
| −140 Mesh | +200 Mesh | 0.54 |
| −200 Mesh | +325 Mesh | 8.13 |
| −325 Mesh | +400 Mesh | 1.43 |
| −400 Mesh | | 89.87 |

The aggregate used in addition to the silica flour can be any material which does not adversely affect the curing of the polyester resin. Excellent results are obtained by using silica aggregate graded in accordance with the New York Port Authority Schedule shown in the following table:

TABLE IX

| Sieve Size (Square Openings) | Percent Passing By Weight | | |
|---|---|---|---|
| | Fine Aggregate | ¾" Coarse Aggregate | 1½" Coarse Aggregate |
| 2" | — | — | 100 |
| 1½" | — | 100 | 95–100 |
| 1" | — | 95–100 | 55–75 |
| ¾" | — | 60–80 | 35–55 |
| ⅜" | — | 15–40 | 5–20 |
| No. 4 | 90–100 | 0–5 | 0–5 |
| No. 8 | 80–95 | (Used for thin sections) | (Used for heavy sections) |
| No. 30 | 25–55 | | |
| No. 50 | 13–25 | | |
| No. 100 | 0–5 | | |

EXPLANATION OF THE STABILIZATION OF LIQUID PLASTIC MATERIALS PRIOR TO CURING AND THE IMPROVEMENT OF THE PROPERTIES OF CURED PLASTIC MATERIALS BY THE USE OF FINELY DIVIDED SOLID PARTICLES OF SUBSTANCES NORMALLY CHEMICALLY INERT TO SUCH PLASTIC MATERIALS

As commercially available for use, the liquid forms of the plastic or resinous materials used in our invention may be described as mixtures of three-dimensional high molecular weight polymer or copolymer resin or monomer molecules graded as to size and codispersed into a space network or lattice and possessing multiple points of potential attachment. The initially liquid forms of such a mixture are inhibited as to chemical reactivity only partially. For example, in the case of a polyester resin-styrene monomer mixture, hydroquinone (a reducing agent) is introduced for the purpose of donating two hydrogen atoms to inactivate the resin-monomer by preventing the free radicals from attacking the double bonds of unsaturation, or methyl linkage. This stops or delays addition-polymerization until the available hydrogen atoms from the hydroquinone are exhausted. The chemically unstable state of this mixture limits its use in relation to time, temperature and exposure to light. Further, in curing such a mixture by introducing, for example, a catalyst in the form of methyl-ethyl-ketone peroxide it is difficult or impossible to achieve a perfectly balanced reaction. Unsatisfied free radicals remain, resulting in an unstable product in which a degree of addition-polymerization continues to exert a deteriorating effect.

We have discovered that by introducing into the space-network or lattice of molecules of a resin, monomer or resin-monomer mixture modifying finely divided solid particles (especially in the 0.004 to 20-micron range) of substances normally chemically inert thereto we achieve the following results:

1. The shelf life of the resinous material in uncured state is extended as much as several times of that of a similar unmodified material.
2. The chemical reactivity of the curing process is not impaired by introduction of the fine particles.
3. An increase of as much as several hundred percent in the strengths of resinous materials employed as bonding agents.
4. The mixture of resinous materials and fine particles may be used with or without aggregates (solid particles above the 20-micron size) to make adhesive coatings of exceptional strength and durability.
5. Structural characteristics of the cured resinous materials are modified as to adhesion, rigidity and strength as to permit the composition of cements of resinous materials and fine particles which will impart to concrete strength several times that obtained by the use of similar cements without the modifying fine particles. Within the optimum range of effect, the degree of modification is proportional to the ratio of fine particles to total cement, by weight.
6. Stability in the curing of resinous concrete cements is so improved as to achieve air uninhibited curing accompanied by reduction to a negligible degree of the exothermic heating of curing, with a resulting reduction in stress distortion.

The explanation for the above results is thought to be as follows:

The uncured resinous materials of our invention are mixtures of high molecular polymer or copolymer molecules graded and codispersed into a space network or lattice. The resinous materials possess multiple points of potential attachment, which in the past have been only partially and temporarily inhibited as to chemical reactivity. These resinous mixtures exhibit substantial static electrical charges.

The finely divided particles described, consisting of chemical compounds in solid or colloidal state in which the particle sizes range from about 20 microns downward (preferably to 0.004 micron) take on substantial static electrical charges in much the same manner as the micromolecules and macromolecules of the resinous mixtures.

To stabilize the uncured resinous mixture and inhibit chemical linkage without inducing a chemical reaction, the chemically inert, finely divided charged particles are intimately dispersed within the lattice of the resinous molecules and act similar to ions or radicals in a chemical compound undergoing a chemical reaction. To the extent of demand, attachments through electrical attraction occur between the particles and the resinous molecules. These attachments largely satisfy the reactive demand of the uncured resinous molecules, inhibit the addition-polymerization process, and substantially increase the shelf life of the resinous mixture.

Upon catalyzation in curing, these attachments by electrical attraction yield, to the extent of demand, to the true chemical reaction. Except as so displaced, the fine particle remains attached (as a group of atoms) to the resinous molecules to give the effect of enlarged macromolecules possessing increased power of attraction to other and similar molecules within the lattice and increased adhesion to the faces of solids to which the mixture is applied. The effect is much the same as though a new substance consisting of a combination of resinous molecules and fine particles, acting jointly, has been created.

The fine particles give cured resinous mixtures strength, rigidity and adhesion to other materials amounting to several times the value inherent in the same resinous mixtures which have been cured without such modification by use of the finely divided particles. The degree of modification of the resinous mixture properties which is achieved by addition of the fine particles is related directly (within optimum limits given below) to the ratio by weight of fine particles to total cement in which the term "total cement" refers to the combination of resinous materials and fine particles.

USE OF FINELY DIVIDED SOLID PARTICLES TO EXTEND THE SHELF LIFE OF PLASTICS AND MONOMERS

A mixture of two orthophthalic high molecular weight polymer polyester resin-styrene monomer products of Cook Paint and Varnish Company (believed to be the products of condensation-polymerization processes between phthalic anhydride and adipic acid and propylene glycol and containing 200 p.p.m. of hydroquinone as an inhibitor) had the following properties:

CONTROL MIXTURE

| Resin | Styrene Additive | Parts by Weight | Mfgr's Rated Storage Stability |
| --- | --- | --- | --- |
| C-100 (Rigid) | 33% | 60 | 6 Months |
| C-200 (Flexible) | 20% | 40 | 12 Months |

This mixture was placed in pint cans and examined at 6-month intervals. At the end of the second interval, examination revealed the resin was no longer usable, with polystyrene having formed on top of cured resin in the specimen.

Using the same resin formulations a test mixture was prepared in which the styrene additive was deliberately increased from 27.7 to 49.3 percent of the resin, and fine particles were added to stabilize the control mixture as follows:

TEST MIXTURE I (1)

| Constituent | Parts by Weight |
| --- | --- |
| C-100 Resin | 41.22 |
| C-200 Resin | 27.48 |
| Added Styrene | 11.64 |
| Silica Flour | 7.30 |
| Titanium Flour | 9.53 |
| Colloidal Silica | 0.50 |

The fine particles (those below 20 microns) totaled 13.46 parts constituting 16.70 percent of the weight of resin-monomer and including 10.03 parts or 75 percent submicron particles.

This mixture was placed in pint cans and examined at 6-month intervals. At the end of 2 years, the mixture was found to be usable, and normal curing resulted from catalyzation with methyl-ethyl-ketone peroxide.

Another test mixture was prepared of the same ingredients by raising the styrene content well beyond the formulator's recommendations for stability as follows:

TEST MIXTURE I (2)

| Constituent | Parts by Weight |
| --- | --- |
| C-100 Resin | 41.22 |
| C-200 Resin | 27.48 |
| Added Styrene | 18.51 |
| Silica Flour | 17.30 |
| Titanium Flour | 9.35 |
| Colloidal Silica | 0.50 | resulting in styrene equal to 62 percent of resins and significant fine particles equal to 18.16 parts constituting 20.8 percent of the resin-monomer and including 10.03 parts or 55.2 percent submicron particles.

This mixture was placed in pint cans and examined at regular intervals of 3 months. At the end of 4 years, 3 months, the mixture was found to be usable. At the end of 4 years, 6 months, initial deterioration was evidenced. At the end of 5 years, the mass was still gelatinous, and no polystyrene crystals had formed.

These tests demonstrated that introducing into a resin-monomer mixture finely divided charged particles of inert materials, even though the styrene is well above the resin-styrene cross-linking capacity, a. extended the shelf life of the resinous material several times that of similar unmodified materials; and b. the chemical reactivity of the curing process was not impaired by introduction of the fine particles.

Ideally, for the more common purposes of our invention, we employ an isophthalic resin with about 50 percent styrene additive stabilized as follows:

EXAMPLE 5

| Constituent | Parts by Weight |
| --- | --- |
| Resin-monomer | 100 |
| Chemically inert fine particles (less than 20 microns) about | 110 |
| Including submicron particles of about | 10 |

The foregoing shows that fine particles in an amount of some 15 to 20 percent by weight of the resin-monomer mixture were effective in stabilizing the uncured resinous material in storage. About 10 percent of the submicron size is desirable for achieving an intimate mixture and desirable suspension in the resinous material in storage. The figure of 110 percent (by weight of the resin) of fine particles, of which 10 percent is of submicron size, is an approximate maximum which may be used without impairing the mixture of resin-monomer and fine particles as a cement ingredient for concrete in the cured state. Addition of inert particles ranging upward from about 20-micron size, i.e., aggregate, does not impair the qualities of the mixture.

USE OF FINELY DIVIDED SOLID PARTICLES TO IMPROVE THE QUALITIES OF RESINOUS ADHESIVE COATINGS

The high polymer or copolymer resins and resin-monomer mixtures, used without modification as adhesive coatings or protective coatings, have proven unsatisfactory because bond strengths are weak and unreliable and stability is seriously influenced by exposure to heat and light.

Finely divided particles of inert solids mixed with resinous compounds make adhesive or protective coatings of improved stability and strength over those of the resinous mixtures alone. In making such a coating to be applied, say, to a metallic surface, fine particles (under 20-micron size) are utilized to modify the characteristics of the resinous mixture. Larger particles than 20 microns and possessed of little or no effective static charge may be employed as aggregates in a concrete mixture. These and the metallic surfaces afford faces of attachment. The optimum use of the finely divided particles in combination with larger particles effects a more perfect gradation of particle size and results in a greater uniformity of resin-monomer mixture distribution, and minimum film thickness thereof on the planes of surfaces to which it is applied. Hence, there is a more uniform distribution of strength on the plane of attachment, accompanied by a material reduction of the exothermic heating, reducing curing stresses and distortion to a negligible factor.

When the catalyst of the curing process has been used to optimum effect by the resinous molecules, the finely divided charged particles neutralize remaining free radicals, and stop addition-polymerization. A degree of stability of the cured mixture is thus achieved that is otherwise impossible of accomplishment through conventional chemical methods and processes hitherto employed.

We composed, using 100 parts of resin-monomer, the following mixture:

EXAMPLE 6

| Constituents | Parts by Weight |
| --- | --- |
| C-100 Resins (Exclusive of styrene) | 38.57 |
| C-200 Resins (Exclusive of styrene) | 28.50 |
| Styrene Monomer (Total) | 32.93 |
| Inert Aggregates (−100 mesh to +20 microns) | 5.45 |
| Fine particles | 27.38 | in which the significant fine particles constituted 27.38 percent by weight of the resin-monomer mixture including 14.41 percent of submicron particles all conforming to the analysis given in the following table X:

TABLE X—Fine Particles of Example 6

| Chemical Composition Component | Particle Size Percent | Less Than | % by Weight |
| --- | --- | --- | --- |
| $TiO_2$ | 47.22 | 20 Microns | 100 |
| $SiO_2$ | 37.20 | 1 Micron | 52.6* |
| $Al_2O_3$ | 15.29 | | |
| $P_2O_5$ | 0.141 | | |
| $K_2O$ | 0.103 | | |
| $Fe_2O_3$ | 0.019 | | |
| $CaO_2$ | 0.012 | | |
| $Sb_2O_3$ | 0.005 | | |
| $Na_2O$ | 0.004 | | |
| $MgO$ | 0.002 | | |

*includes particles down to 0.004 micron

A portion of this mixture was catalyzed with 1 percent of methyl-ethyl-ketone peroxide and placed before curing on the flanges of two sections of 6 inch × 6 inch × 6 inch I-beams, the surfaces of which had been sandblast cleaned to "white" metal. One section was fixed in a level position and coated and the other was coated on the cleaned surface and laid on top of the first. Excess of the adhesive mixture squeezed out by the weight of the upper section was cleaned from the edges. After 48 hours of curing, a direct tensile force of 100,000 pounds was applied by means of lugs attached to the opposite faces of the beam sections without producing bond failure. The demonstrated bond strength of some 7,600 p.s.i. compares with a variable and unreliable bond strength in the range of 500 to 2,000 p.s.i. for similar but unmodified resins. The difference is achieved by modification of the properties of the cured resin-monomer mixture through the use of inert finely divided charged particles.

In modifying basic resins by introducing fine particles into the lattice we have found that a combination of different fine particle materials appears to add to the complexity of the resin-monomer molecular structure, thereby increasing its molecular weight and resulting in an increase of strength by comparison with results obtained from a single simple fine particle material. The fine particle constituent of example 6 as delineated in table X was obtained through a combination of the fine particles of table I (Silica Flour), table II (Titanium Flour), table IV (Aluminum Silicate), and colloidal silica. The principal constituents varied as to molecular weight and magnetic susceptibility as follows:

| Substance | Percent by Weight | Rounded Molecular Weight | Magnetic Susceptibility |
| --- | --- | --- | --- |
| $SiO_2$ | 47.45 | 60 | Negative |
| $TiO_2$ | 37.28 | 80 | Positive |
| $Al_2O_3$ | 14.97 | 102 | Negative |

In this relatively complex formulation, we effectively used fine particles in an amount of 27 percent by weight of a relatively weak resin-monomer to achieve a strong and stable adhesive. This would not be feasible with fine particles of simpler character even though stronger basic resins were utilized. To illustrate, Reichhold Chemical Company's Polylite isophthalic resins, as described in following table XI, were employed in a series of formulations:

TABLE XI

PHYSICAL PROPERTIES OF POLYLITE RESINS

| Properties of Unfilled Resins | Rigid resin 93-419 | Flexible resin Unfilled 31-830 |
| --- | --- | --- |
| Styrene additive | 40% | 30% |
| Flexural modulus, p.s.i. | 17-18,000 | Yields |
| Flexural modulus, p.s.i. | 6-7×10⁵ | Yields |
| Heat distortion, temp. °C. | 111 | Yields |
| Compressive strength, p.s.i. | 26-27,000 | Yields |
| Tensile strength, p.s.i. | 8-9,000 | 2.5-3,000 |
| Barcol hardness | 50-55 | — |

Coating formulations were made by increasing the styrene additive to 50 percent in each case and varying the proportions of the two resins and the character and content of the fine particles. Three-inch steel bars were cut, the surfaces milled, sandblast cleaned and then joined with the adhesive formulations and tested in direct tension to determine the optimum quantities of modifying fine particles and the strengths developed through use of two fine particle ingredients. The results are given in following table XII:

TABLE XII.—ADHESIVE TEST RESULTS FROM A GIVEN RESIN-MONOMER AND TWO FINE PARTICLE CONSTITUENTS (50% rigid resin with 50% styrene additive)

| Mix No.: | Res.-mon., pts. by wt. | Fine particles Composition | Fine particles Parts by wt. | Aggregate, pts. by wt. | Adhesive strength, p.s.i. |
| --- | --- | --- | --- | --- | --- |
| 1 | 100 | $SiO_2$ | 0 | 0 | 4,429 |
| | | $TiO_2$ | 21.95 | | |
| 2 | 100 | $SiO_2$ | 3.44 | 3.88 | 5,023 |
| | | $TiO_2$ | 14.64 | | |
| Total | | | 18.08 | | |
| 3 | 100 | $SiO_2$ | 5.16 | 5.82 | 4,860 |
| | | $TiO_2$ | 10.98 | | |
| Total | | | 16.14 | | |
| 4 | 100 | $SiO_2$ | 6.88 | 7.76 | 4,670 |
| | | $TiO_2$ | 7.32 | | |
| Total | | | 14.20 | | |
| 5 | 100 | $SiO_2$ | 8.60 | 9.70 | 4,478 |
| | | $TiO_2$ | 3.66 | | |
| Total | | | 12.26 | | |
| 6 | 100 | $SiO_2$ | 2.14 | 2.41 | 4,720 |
| | | $TiO_2$ | 9.09 | | |
| Total | | | 11.23 | | |
| 7 | 100 | $SiO_2$ | 3.44 | 3.88 | 4,955 |
| | | $TiO_2$ | 14.64 | | |
| Total | | | 18.08 | | |
| 8 | 100 | $SiO_2$ | 4.16 | 4.69 | 5,070 |
| | | $TiO_2$ | 17.72 | | |
| Total | | | 21.86 | | |
| 9 | 100 | $SiO_2$ | 4.95 | 5.58 | 5,250 |
| | | $TiO_2$ | 21.05 | | |
| Total | | | 26.00 | | |
| 10 | 100 | $SiO_2$ | 5.79 | 6.53 | 5,320 |
| | | $TiO_2$ | 24.66 | | |
| Total | | | 30.45 | | |
| 11 | 100 | ASP | 13.23 | | 4,600 |
| | | $TiO_2$ | 4.41 | | |
| Total | | | 17.64 | | |

Table XII—Continued

| # | | | | | |
|---|---|---|---|---|---|
| 12 | | 100 | ASP | 18.75 | 5,410 |
| | | | TiO₂ | 6.25 | |
| Total | | | | 25.00 | |
| 13 | | 100 | ASP | 25.00 | 5,160 |
| | | | TiO₂ | 8.33 | |
| Total | | | | 33.33 | |
| 14 | | 100 | ASP | 8.82 | 3,300 |
| | | | TiO₂ | 8.82 | |
| Total | | | | 17.64 | |
| 15 | | 100 | ASP | 12.50 | 5,140 |
| | | | TiO₂ | 12.50 | |
| Total | | | | 25.00 | |
| 16 | | 100 | ASP | 16.67 | 3,190 |
| | | | TiO₂ | 16.67 | |
| Total | | | | 33.34 | |

Figure 4:
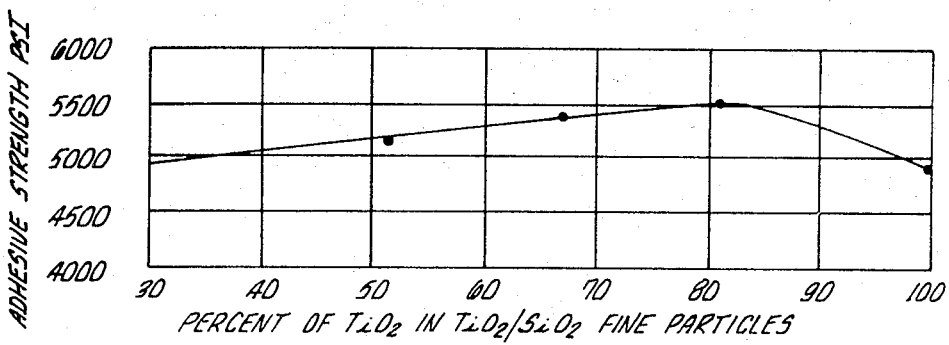
FIGS. 4 through 13 are graphs showing the effect of fine particles used on various properties of resinous mixtures in accordance with this invention.

Mix formulations No. 1 to 5 in table XII show, that in using fine particles composed of $TiO_2$ and $SiO_2$ as modifiers, an optimum ratio of utilization occurs at the value of 4.25 as represented by Mix No. 2 and shown in FIG. 4.

Figure 5:
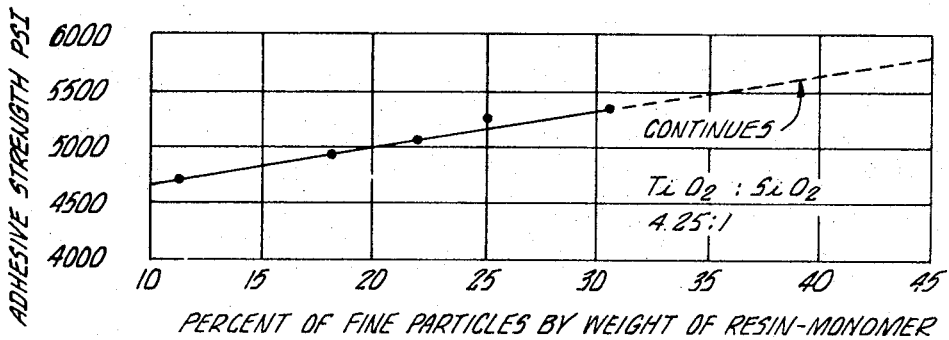

Mix formulations No. 6 to 10 show, that in using the optimum 4.25 ratio of the two materials, improvement in strength occurred with increased quantity of fine particles throughout the range which extended past 30 percent as shown in FIG. 5 up to 6,300 p.s.i.

Referring to the maximum quantity (as a percent of resin-monomer) of a given mixture of fine particles which will produce increasing strength as the "tolerance limit" for such mixture, it is seen that:

A. Within the "tolerance limit" the improvement obtained from a given quantity of fine particles of optimized mixtures is greater in all cases than from an equal amount of unoptimized mixtures. (Compare Mix No. 1 with No. 8)

B. The "tolerance limit" for optimized mixtures is greater than for unoptimized mixtures. (Compare No. 10 with No. 12 and No. 15)

Figure 6:
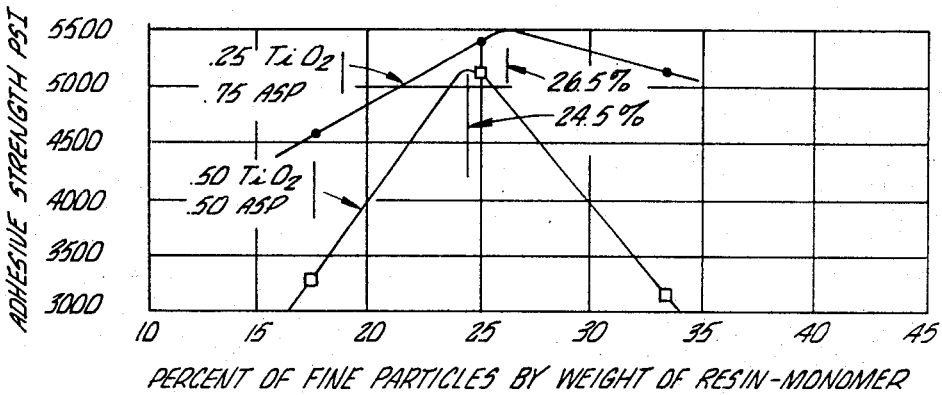

C. The "tolerance limit" is greater for multiple than for simple constituents. (Compare FIG. 5 with FIG. 6)

Comparing these adhesive values and numerous others obtained by use of single and double constituent fine particles with semirigid to full rigid resinous materials, the values, up to 6,300 p.s.i., are in all cases less than those obtained from the unoptimized mixture of example 6 in which a multiplicity of fine particles was employed.

As shown below in connection with concrete cements, the "tolerance limits" of resin-monomer mixtures for modifying fine particles lies in the range of about 90 to 110 percent of the weight of the resinous material, depending upon the complexity of fine particle constituents. In composing adhesive or protective coatings, a practical limitation is imposed by the wetting ability of the resinous material. Coatings must be sufficiently fluid to readily wet the fine particles and the surfaces to which the coating is applied when brush, squeegee or spray application procedures are employed. The preferred method of application to porous substrates is by stiff brush or squeegee to work the coating material into the voids and pores or surface irregularities to obtain complete coverage and maximum anchorage of the coating. For dense substrates such as steel the preferred method of application is by airless spray equipment to drive the coating into all surface irregularities and to avoid incorporation of air bubbles which may lead to penetration of the cost by corrosive substances or to weakening of the bond by voids. While optimum modification of the resinous material by use of fine particles is desirable in a coating to achieve maximum strength, other characteristics necessary to a workable coating mixture may dictate utilization of a somewhat lesser quantity of fine particles in the coating mixtures.

Accepting this limitation, coatings are composed of resinous materials, fine particle constituents and in some cases aggregates, each component of which contributes to the end result sought. In citing the following examples, it is not intended that the invention be limited to the chemical composition of the fine particle constituents or to those of the resinous mixtures cited, nor to the quantities of each employed.

A protective coating for vessels used in the handling and storage of hydrofluoric acids is made as follows:

EXAMPLE 7

PROTECTIVE COATING FOR HYDROFLUORIC ACID APPLICATIONS

| Ingredient | Parts by Weight |
|---|---|
| Resin: Isophthalic high-polymer polyester, 50% to 100% rigid, 33% to 50% styrene additive | 100 |
| Fine Particles: A fluoride, such as $AlF_3$, $MnF_3$, $TiF_3$ | 30–50 |
| Aggregates: Fluoride crystals of greater than 20-micron size | As required |
| Preferred application: By airless spray | |

0.005

A protective coating for structural steel in salt atmosphere is made as 0.002 *includes

EXAMPLE 8

| Ingredient | Parts by Weight |
|---|---|
| Resin: Isophthalic polyester, 25% to 50% rigid, about 33% to 50% styrene additive | 100 |
| Fine particles: $TiO_2/SiO_2$ in the ratio of about 4.25:1 | 30–110 |
| Aggregates: $SiO_2$ in sizes over 20 to about −100 microns | As required |
| Pigment: As required to produce desired color | |

A high-strength adhesive coating for bonding two steel bodies together is made as follows:

EXAMPLE 9

| Ingredient | Parts by Weight |
|---|---|
| Resin: Isophthalic polyester, 50% to 100% rigid, about 33% to 50% styrene additive | 100 |
| Fine Particles: Preferably a multiplicity of constituents, for example a combination of $TiO_2$, $SiO_2$, and $Al_2SiO_3$ | 30–110 |
| Aggregates: As required for the end use | |

From the foregoing examples it is obvious that the composition of coatings as contemplated under our discovery involves the selection of resinous constituents, fine particle constituents and, if used, aggregate constituents, each possessing fundamental characteristics compatible with the qualities sought in the end product. Depending upon chemical and physical environment to which a coating of our invention may be subjected, one or more of the following plastic substances may be used in lieu of the polyester resin-styrene monomer mixture of the cited examples:

| Thermosetting Resins | Thermoplastic Resins |
|---|---|
| Epoxies | Nylon |
| Aminos | Polycarbonates |
| Alkyds | Acrylics |

Phenolics
Urethanes
Allylics
Silicones
Cross-linked Polyethylene
Vinyl Ester

Acetals
Vinyls
Cellulosics
Styrenes
Chlorinated Polyethers
Fluorocarbons
Polypropylene
Polyethylene

USE OF FINELY DIVIDED SOLID PARTICLES TO IMPROVE THE QUALITIES OF RESINOUS CEMENT CONCRETES

The modifying effects of chemically inert finely divided solid particles on the properties of high polymer or high copolymer resins, monomers and mixtures thereof are used to formulate cements for use in concrete mixture designs so as to impart to these concretes a variety of structural properties defined within narrow limits and including strength, modulus of elasticity, creep and temperature response. In formulating a cement ingredient composed of resinous materials and fine particles, it has been found that properties imparted to the concrete mixture designs are directly related to and dependent upon (1) the initial character of the resinous component, (2) the composition of the fine particle constituents, and (3) the ratio of fine particles to the total cement ingredient.

The purpose of concrete formulations is to take available aggregates, having properties consistent with the qualities sought in the end product, of appropriate sizes continuously graded from the largest to the smallest particles employed to achieve minimum voids in the mass, and to cement them together with an ingredient which fills the remaining voids and bonds the aggregates together, to permit forming or placing of the mass into structural members of desired form and dimension. The volume of the concrete consists primarily of the aggregate constituent, and the concrete characteristics are largely derived from the character of the aggregate employed. The primary function of the cement ingredient is to impart to the concrete mass as a solid the characteristics of solid particles of aggregate. Its secondary functions are to act as liquid chemical, electrical and thermal barriers. To accomplish these purposes, the cement ingredient should remain 100 percent solid by volume through the curing process, and exothermic heating during curing should be reduced to a negligible factor to prevent curing distortion and unequal stress distribution. These purposes are largely achieved through selection, modification and proportioning of the ingredients.

INITIAL CHARACTER OF RESINOUS COMPONENT

An arbitrary concrete mixture was composed in which the basic ingredients were as shown in test mixture III (1).

TEST MIXTURE III (1)

Effect of Initial Character of Resinous Component

| Ingredient | Parts By Weight | |
|---|---|---|
| Resin-monomer | 8.20 | |
| Fine particles (−20 to 0.1 micron) | 10.35 | |
| Total cement | | 18.55 |
| Coarse aggregate (¼" to 100 mesh) | 69.40 | |
| Fine aggregates (100 mesh to 20 microns) | 12.05 | |
| Total aggregates | | 81.45 |
| Ratio of fine particles to total | | 55.80% |

Figure 7:
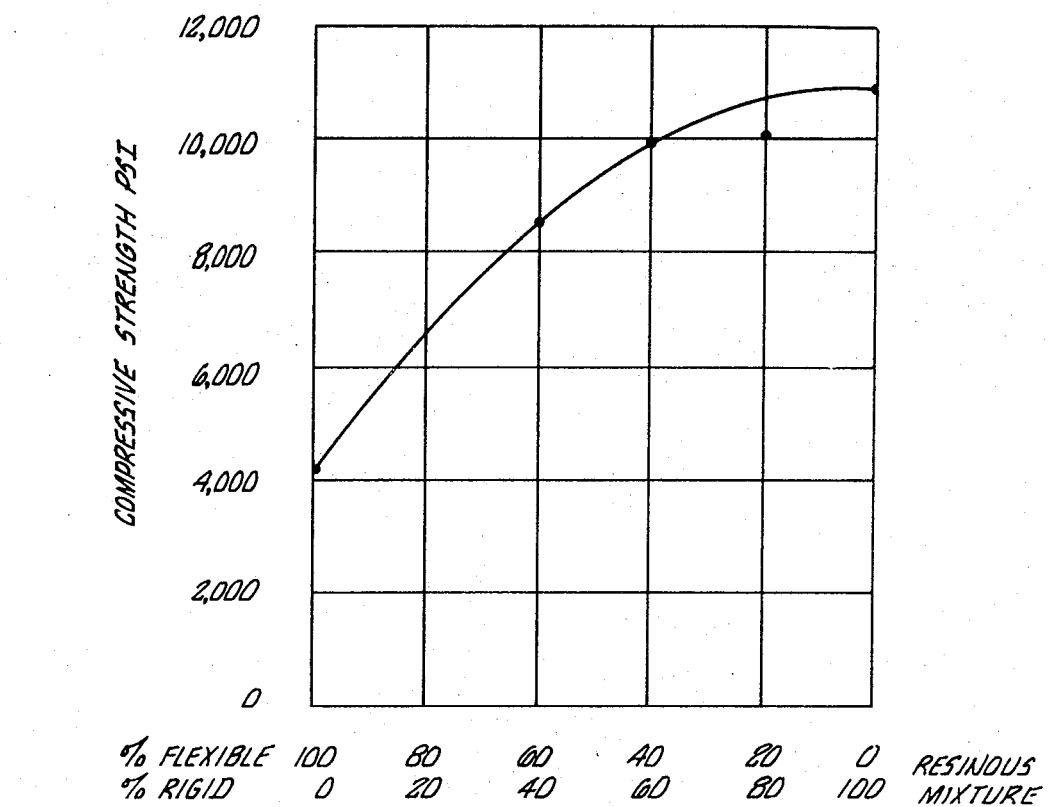

This mixture was not optimized to achieve maximum strength in that (1) fine particles were limited to two constituents, (2) the optimum ratio of the two constituents was not employed, and (3) the fine particle ratio for the ingredients used was excessive. Purpose of the mixture was twofold: First, to measure the capability of fine particles to so modify a fully flexible resinous cement ingredient as to achieve a concrete of substantial strength and definite structural characteristics, and second, to provide an approximate range of values between fully flexible and fully rigid resins when modified by a given mixture of fine particles. To this end, the resin ingredient was varied by steps between 100 percent flexible and 100 percent rigid isophthalic polyester resins. All specimens exhibited definite stress-strain relationships with strengths as shown by FIG. 7 varying between 4,306 p.s.i. for the fully flexible resins and 10,864 for the fully rigid, the latter being equal to some 250 percent of the former.

OPTIMIZATION OF FINE PARTICLES

Considering the cement as being composed of the combination of the resinous materials plus fine particles:

1. The modifying effect of the fine particles, within the optimum range of usage, is essentially proportional to the ratio of fine particles to total cement (by weight).
2. The maximum modification is achieved when the range of fine particles extends continuously from 20 microns to submicron size and the ratio of fine particle constituents is optimized.
3. Beyond the optimum values an increase in the ratio of a given mixture of fine particles to total cement is detrimental to strength.

We made a series of concrete mixtures in which the resinous ingredient of the cement consisted of the two isophthalic polyesters of table XI each with styrene monomer additive increased to 50 percent. A relatively weak resin is composed of 75 percent flexible resin and 25 percent rigid, estimated to produce in unmodified form a concrete compressive strength of less than 4,000 p.s.i. The resin content is held constant at 8.2 percent of the total mixture in each case. The purpose is to measure the modifying effect of fine particles without exceeding the strength of the basic aggregate, which was approximately 16,000 p.s.i. The essentials of the mixtures are given in following table XIII:

TABLE XIII

Concrete Mix Designs to Test

The Modifying Effect of Fine Particles

First Mixture

| Ingredient | Parts By Weight | |
|---|---|---|
| Resin-monomer | 8.20 | |
| Fine particles | 0.60 | |
| Total cement | | 8.80 |
| Coarse aggregates | 87.96 | |
| Fine aggregates | 3.24 | |
| Total aggregates | | 91.20 |
| Ratio of fine particles to total cement | | 6.80% |

Second Mixture

| Ingredient | Parts By Weight | |
|---|---|---|
| Resin-monomer | 8.20 | |
| Fine particles | 2.73 | |
| Total cement | | 10.93 |
| Coarse aggregates | 74.20 | |
| Fine aggregates | 1487 | |
| Total aggregates | | 89.07 |

| Ingredient | Parts By Weight |
|---|---|
| Ratio of fine particles to total cement | 25.00% |

Third Mixture

| Ingredient | Parts By Weight |
|---|---|
| Resin-monomer | 8.20 |
| Fine particles | 8.74 |
| Total cement | 16.94 |
| Coarse aggregates | 74.20 |
| Fine aggregates | 8.86 |
| Total aggregates | 83.06 |
| Ratio of fine particles to total cement | 51.60% |

Figure 8:
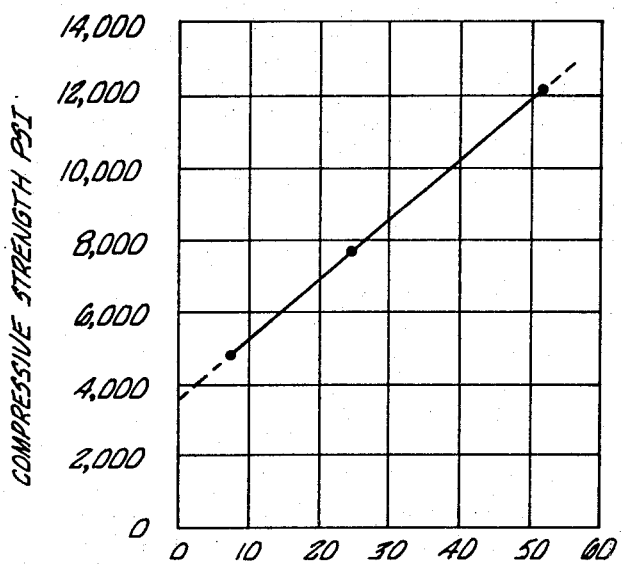
Figure 9:
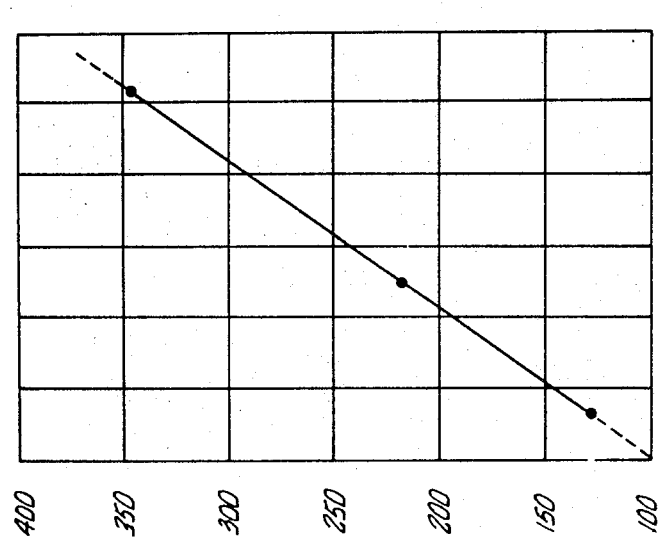

In FIG. 8 the strengths achieved are plotted against the fine-particle: total-cement ratio, indicating a straight line variation pointing to an unmodified strength of some 3,500 p.s.i. and extending to 12,105 p.s.i. at a 0.516 ratio. In FIG. 9 the actual strength as a percentage of the 3,500 p.s.i. unmodified strength is plotted against the fine-particle: total-cement ratio to indicate a maximum value of some 350 percent in the range of evaluation.

Figure 10:
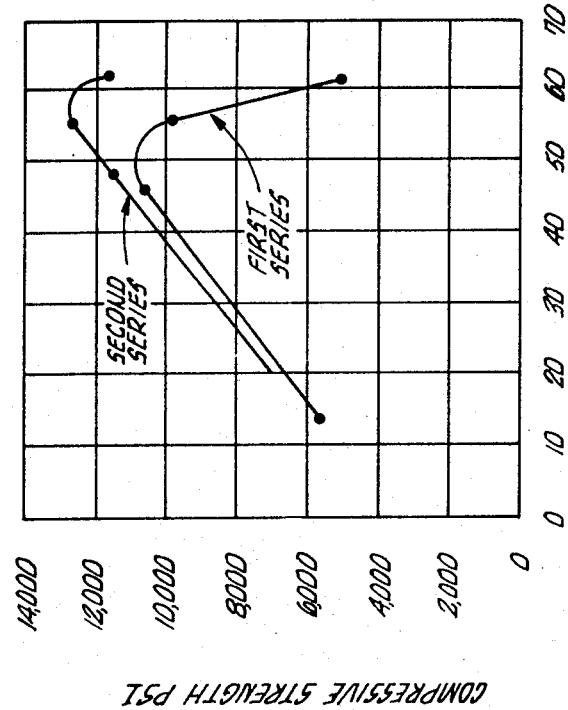

Two series of unoptimized concrete mixtures were made to show the three listed effects. In the first series the fine particle constituents were obtained from the silica flour of table I and the traprock dust of table III and vary between $-20$- and $+1$-micron size. In the second series a third ingredient was added from the titanium flour of table II. As shown in FIG. 10 addition of the third ingredient to the fine particle constituents increased the strength and extended the "tolerance limit" of the 8.2 percent resin material consistent with the results shown in FIGS. 5 and 6 in connection with adhesives.

We used an aggregate having a compressive strength of about 16,000 p.s.i. with optimum grading, fine particles extending into the submicron size and the same quantity (8.2 percent) of resin-monomer varied as to flexibility, to achieve the results shown in following table XIV:

TABLE XIV.—MODIFICATION RESULTS

| Resin-monomer Percent | Rigidity, percent | Percent total cement | Percent fine particles | Comp. strength | Notation |
|---|---|---|---|---|---|
| 8.2 | 50 | 10.92 | 24.9 | 9,293 | |
| 8.2 | 75 | 10.92 | 24.9 | 14,770 | |
| 8.2 | 100 | 10.92 | 24.9 | 15,916 | Agg. failure. |
| 8.2 | 50 | 13.72 | 40.2 | 15,916 | Do. |
| 8.2 | 75 | 13.72 | 40.2 | 15,218 | Do. |
| 8.2 | 100 | 13.72 | 40.2 | 15,430 | Do. |

A stronger aggregate was next obtained in the form of tabular alumina conforming to the composition of table V, with fine particles ground from the same material, to test the modifying capability of a 50 percent flexible resin-monomer mixture in which all elements of the mixture were optimized (resin-monomer 6.66 by weight or 24 percent by volume). This yielded a concrete with a compressive strength of 19,600 p.s.i. and a tensile strength of 3,300 p.s.i. in which the failures were in the aggregates in each case.

An excellent high tensile-compressive strength concrete mix design is made as follows:

EXAMPLE 10

| Ingredient | Parts By Weight |
|---|---|
| Resin-monomer (100% rigid, 50% styrene additive) | 5 to 7 |
| Fine particles | 5 to 7 |
| Aggregates | 86 to 90 |

Figure 11:
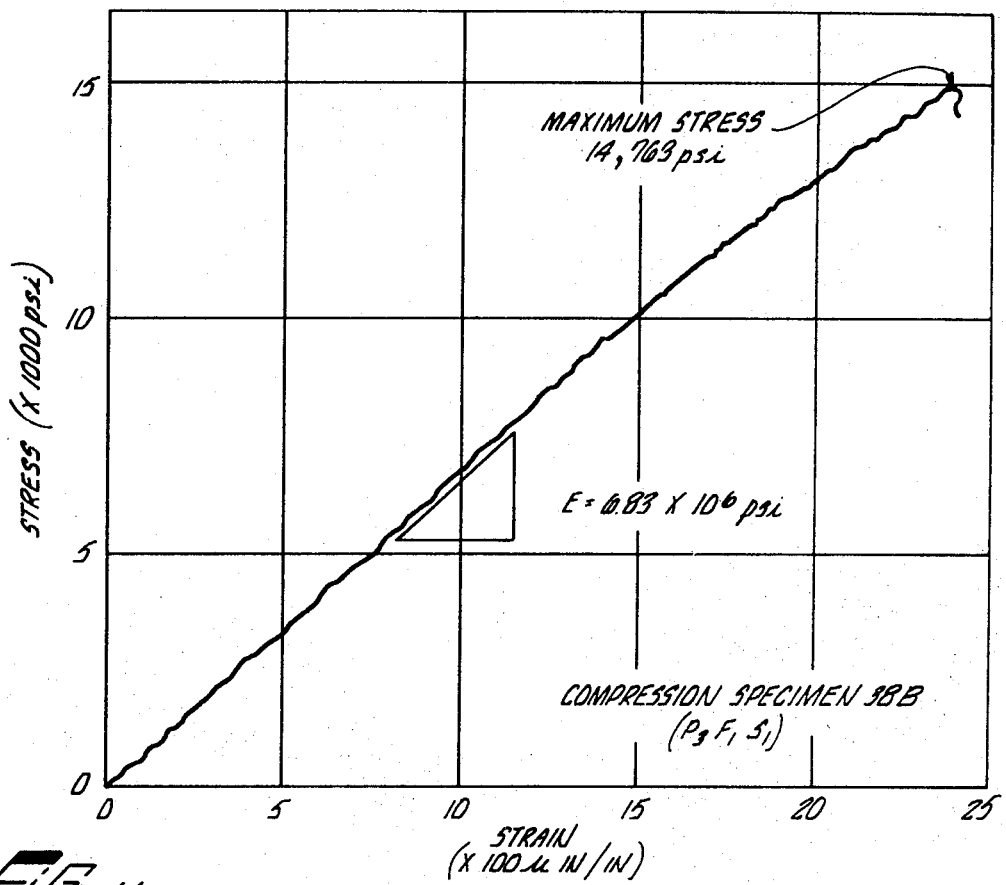
Figure 12:
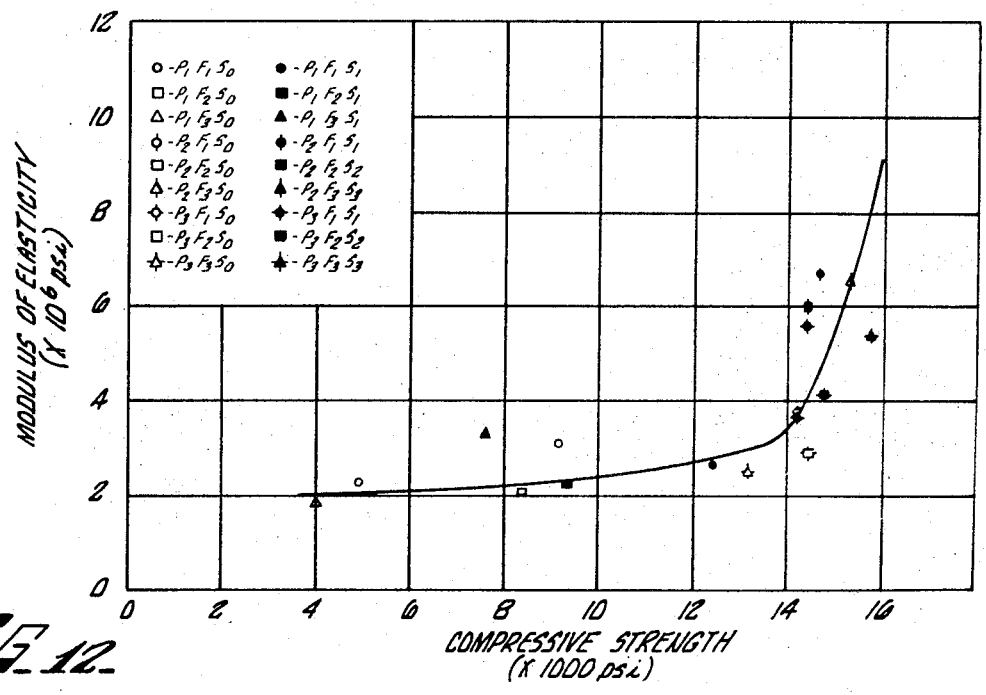
Figure 13:
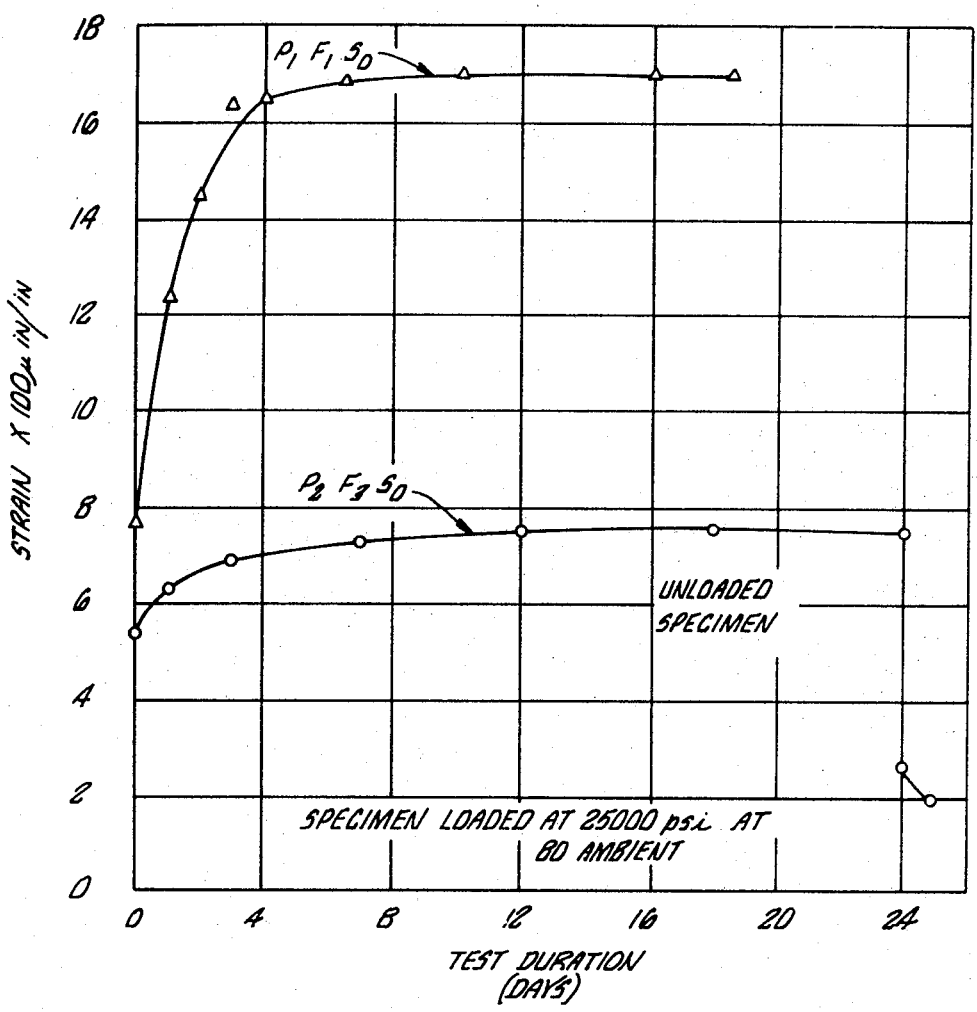

In general, we find that in optimizing our designs:

1. A continuous gradation of aggregates contributes to strength. This is attributed to a reduction of the cementing ingredient film thickness and improvement in uniformity of the film. This is particularly true of resinous materials which, if cured in appreciable thicknesses, exhibit severe distortion and nonuniformity of stress distribution. For this reason, an excess of cement is detrimental to strength.
2. Modification of the resinous mixtures by use of fine particles leads to a major reduction in exothermic heating and reduction to a negligible degree of heat (and stress) distortion during curing. By actual measurement, mass concretes made from resins which, in unmodified form, exhibit a curing exotherm of the order to 200° have exhibited exotherms limited to 10° maximum.
3. Many of the resins will not cure properly when exposed to air, but concretes made with fine particle-modified resinous mixtures exhibit air-uninhibited curing characteristics. Surfaces exposed to air during cure exhibit no tackiness after cure.
4. As shown in FIG. 11, concretes made using the resinous cements of our invention exhibit definite stress-strain relationships to failure.
5. The nature of the modifying effect of fine particles is essentially that of increasing the characteristics of the basic resins. A wholly flexible resin for example is increased in strength and rigidity. As shown by FIG. 12, the modulus of elasticity is increased with strength to finally equal that of the solid aggregate.
6. Creep characteristics of resinous concretes are definite and limited as to time and proportional to the rigidity of cement employed, as shown by the two examples of FIG. 13.
7. The resinous cement ingredient of the concretes is a practical medium for bonding the concrete to another body. For example, to bond resinous concrete to a bridge deck of Portland cement concrete (to form a liquid or chemical barrier or wearing surface):
   a. Etch or abraid the Portland cement concrete surface to remove the Portland cement film and expose the aggregates.
   b. Apply a film of resinous cement as a prime coat, work it into the concrete pores and into contact with the aggregates, and follow with application of resinous concrete before or after the prime coat has cured.

To apply as a protective and wearing surface, for example, to a steel orthotropic bridge deck surface, first sandblast the steel deck, then apply the cement prime coat, and then the concrete overlay as in the previous case.

8. Resinous concrete may be added to previously cured bodies of the same material without prior surface preparation and without detectable loss of strength through the joint plane.

It is obvious that the purpose of using resinous binding materials in concretes is to obtain qualities which cannot be obtained in Portland cement concrete. Equally obvious is the fact that no single plastic or resinous substance among those contemplated under our invention will satisfy all the needs encountered in the full field of industrial applications.

The advantage of a particular resinous substance employed as a fundamental bonding agent in a concrete may reside in its strength, modulus of elasticity, thermal or electrical resistance, resistance to a given corrosive agent, low cost, or in any of a number of other qualities. In general, a concrete, to be useful, must possess a certain degree of strength and possess, in the total of selected ingredients, certain specific qualities. Concrete mixtures have been made from a variety of aggregates continuously graded from a desired maximum size down to 20 microns and a cementing agent composed of a variety of resinous substances each modified by the addition of fine particles continuously graded from 20 microns to submicron size. The fine particle modification of the resinous component has produced results varying from increased strength to the dramatic imparting of definite structural characteristics where measurable structural characteristics did not reside in the unmodified resinous materials.

We claim:

1. A high pressure, chemically inert pipe comprising a tubular body cast with plastic resin concrete, the tubular body having a wall thickness of at least about 2 inches, the concrete including a cured mixture of plastic resin and aggregate, the aggregate being present in the amount of about 40 percent to about 95 percent of the product by weight, the aggregate being graded in particle size and ranging from less than 400 mesh up through a size about one-half the wall thickness of the pipe, the plastic resin and aggregate being such that the concrete has a compressive strength of at least about 10,000 p.s.i., and a reinforcing wire secured in tension around the tubular body, the wire having substantially the same coefficient of expansion as the plastic resin concrete.

2. A pipe according to claim 1 in which the wire and plastic resin concrete each have a thermal coefficient of expansion of about 0.000012 per degree F.

* * * * *

PO-1050
(5/69)

UNITED STATES PATENT OFFICE
CERTIFICATE OF CORRECTION

Patent No. 3,630,237   Dated December 28, 1971

Inventor(s) William R. Varnell and Mance R. Mitchell

It is certified that error appears in the above-identified patent and that said Letters Patent are hereby corrected as shown below:

Col. 1, line 48, after "1" add --1/2--;

Col. 6, line 58, change "suing" to --using--;

Col. 16, Table XI, change "Flexural modulus" (first occurrence) to --Flexural strength--;

Col. 17, line 65, change "cost" to --coat--;

Col. 18, Example 7, delete "0.005";

line 27, delete "0.002* includes" and add --follows--;

Col. 19, line 69, after "Ratio of fine particles to total" add --cement--.

Signed and sealed this 27th day of June 1972.

(SEAL)
Attest:

EDWARD M. FLETCHER, JR.
Attesting Officer

ROBERT GOTTSCHALK
Commissioner of Patents